(12) United States Patent
Grant

(10) Patent No.: US 8,680,836 B2
(45) Date of Patent: Mar. 25, 2014

(54) REGULATING CURRENT OUTPUT FROM A BUCK CONVERTER WITHOUT EXTERNAL CURRENT SENSING

(75) Inventor: Matthew A. Grant, Palo Alto, CA (US)

(73) Assignee: Active-Semi, Inc. (VG)

(*) Notice: Subject to any disclaimer, the term of this patent is extended or adjusted under 35 U.S.C. 154(b) by 148 days.

(21) Appl. No.: 13/420,710

(22) Filed: Mar. 15, 2012

(65) Prior Publication Data

US 2012/0176113 A1  Jul. 12, 2012

Related U.S. Application Data

(63) Continuation of application No. 12/286,510, filed on Sep. 29, 2008, now Pat. No. 8,159,204.

(51) Int. Cl.
*H02M 3/156* (2006.01)

(52) U.S. Cl.
USPC .......................... 323/285; 323/282

(58) Field of Classification Search
USPC .......................... 323/222, 282–285
See application file for complete search history.

(56) References Cited

U.S. PATENT DOCUMENTS

| | | | | |
|---|---|---|---|---|
| 5,627,460 A | * | 5/1997 | Bazinet et al. | 323/288 |
| 5,793,193 A | | 8/1998 | Hodgins | 323/284 |
| 6,166,521 A | * | 12/2000 | Mercer et al. | 320/125 |
| 6,194,875 B1 | * | 2/2001 | Takimoto et al. | 320/164 |
| 7,248,152 B2 | | 7/2007 | Gilbert et al. | 340/428 |
| 7,307,390 B2 | | 12/2007 | Huynh et al. | 315/291 |
| 7,388,359 B1 | | 6/2008 | Ling | 323/284 |
| 7,518,352 B2 | * | 4/2009 | De Lima Filho et al. | 323/288 |
| 7,795,849 B2 | | 9/2010 | Sohma | 323/271 |
| 2001/0017536 A1 | * | 8/2001 | Darzy | 323/284 |
| 2005/0030264 A1 | | 2/2005 | Tsuge et al. | 345/76 |
| 2005/0134220 A1 | * | 6/2005 | Brohlin et al. | 320/128 |
| 2005/0162931 A1 | | 7/2005 | Portmann et al. | 365/189.01 |
| 2006/0273773 A1 | | 12/2006 | Balakrishnan et al. | 323/284 |
| 2006/0290333 A1 | * | 12/2006 | Fukushi et al. | 323/277 |
| 2007/0194759 A1 | * | 8/2007 | Shimizu et al. | 320/166 |
| 2007/0274015 A1 | * | 11/2007 | Isham | 361/93.1 |

(Continued)

FOREIGN PATENT DOCUMENTS

CN  201541197  8/2010

OTHER PUBLICATIONS

SIPO—The first examination opinion for patent application 200910174160.7 dated Aug. 25, 2011 (9 pages).

*Primary Examiner* — Adolf Berhane
*Assistant Examiner* — Fred E Finch, III
(74) *Attorney, Agent, or Firm* — Imperium Patent Works; Darien K. Wallace

(57) ABSTRACT

A step-down (buck) switching regulator regulates output current without sensing a current external to a converter integrated circuit. The regulator generates a set current that is indicative of a predetermined current level to which the output current is regulated. The regulator generates a sense current whose magnitude is proportional to an inductor current flowing through a power switch during an on time. During a first time period, the sense current is less than the set current. During a second time period, the sense current is greater than the set current. The output current of the regulator is maintained at the predetermined current level such that the first time period is equal to the second time period when the output current equals the predetermined current level. The set current is compared to the sense current in circuitry inside a bootstrap power generator whose voltage fluctuates with the voltage across the inductor.

10 Claims, 9 Drawing Sheets

(56) References Cited

U.S. PATENT DOCUMENTS

| | | | |
|---|---|---|---|
| 2008/0054868 A1 | 3/2008 | Wei | 323/282 |
| 2008/0231249 A1 | 9/2008 | Barrow | 323/315 |
| 2009/0016086 A1* | 1/2009 | Huynh et al. | 363/80 |
| 2009/0026977 A1 | 1/2009 | Omi | 315/294 |
| 2009/0027011 A1* | 1/2009 | Umetsu | 320/145 |
| 2010/0079127 A1 | 4/2010 | Grant | 323/285 |

* cited by examiner

ADJUSTING PULSE WIDTH TO
REGULATE OUTPUT CURRENT

REGULATING CURRENT OUTPUT FROM A BUCK CONVERTER WITHOUT EXTERNAL CURRENT SENSING

CROSS REFERENCE TO RELATED APPLICATION

This application is a continuation of, and claims priority under 35 U.S.C. §120 from, nonprovisional U.S. patent application Ser. No. 12/286,510 entitled "Regulating Current Output From A Buck Converter Without External Current Sensing," filed on Sep. 29, 2008, now U.S. Pat. No. 8,159,204, the subject matter of which is incorporated herein by reference.

TECHNICAL FIELD

The present invention relates generally to the field of power conversion and, more particularly, to a step-down converter that regulates output current without external means of current sensing.

BACKGROUND

A typical step-down (buck) switching regulator that regulates both output voltage and current senses a current flowing through an external resistor in order to regulate the output current flowing through a load. FIG. 1 (prior art) illustrates an exemplary prior art switching regulator 10 with a current sense resistor 11 outside of a converter integrated circuit (IC) 12. In a constant voltage mode, switching regulator 10 regulates output voltage by applying pulses of input voltage to an inductor 13 coupled to a switching bond pad 14. A first error amplifier 15 compares a first internal reference voltage $V_{VREF}$ to the voltage $V_{VFB}$ of a voltage feedback signal to create a first error voltage $V_{VE}$. A controller block 16 converts the first error voltage $V_{VE}$ into a proportional pulse width or proportional duty cycle that is applied to inductor 13. If the magnitude of $V_{VFB}$ is lower than that of the reference voltage $V_{VREF}$, the first error voltage $V_{VE}$ will increase in magnitude of the first error voltage $V_{VE}$. An increasing error voltage $V_{VE}$ increases the pulse width or duty cycle of a top switch 17 and provides more power to the load 18. This regulation is considered constant voltage control.

In a constant current mode, switching regulator 10 regulates output current by sensing a current flowing through current sense resistor 11. Current sense resistor 11 is placed in series with load 18. The voltage drop $V_{IFB}$ across current sense resistor 11 is compared to a second internal reference voltage $V_{IREF}$ by a second error amplifier 19. Second error amplifier 19 outputs a second error voltage $V_{IE}$. The first error voltage $V_{VE}$ is combined with the second error voltage $V_{IE}$ to allow switching regulator 10 to regulate either maximum output voltage or maximum output current. The two control loops enable regulator 10 to operate in both constant voltage and constant current modes.

Regulating output current using current sense resistor 11, however, has several disadvantages. First, resistor 11 is physically large, and occupies valuable space on a printed circuit board. Converter IC 12 can be made small enough to fit inside a small outline transistor (SOT) package. But current sense resistor 11 typically occupies nearly as much space as the entire SOT package. Second, resistor 11 must be precise and have a resistance that remains constant over varying temperature. The price of a precise resistor 11 can increase the cost of regulator 10 by a large portion of the cost of the entire converter IC 12. Third, current sense resistor 11 wastes power. For example, in a typical application in which a 3.6-volt battery is charging at 1 Amp, and a sense current of 1 Amp is flowing through a current sense resistor having a resistance of 100 milli-Ohms, there is a 100 milliwatt loss from the sense resistor. This represents a 2.8% loss in efficiency from the current sense resistor alone. Switching regulator 10 is less efficient and operates hotter because of the power lost through current sense resistor 11. And as the temperature of resistor 11 fluctuates over a wide range, a constant resistance is less likely to be maintained.

A switching regulator is sought that can accurately regulate output current without using a current sense resistor that is external to the converter IC of the switching regulator. In addition, a method of accurately regulating the output current of a switching regulator is sought that does not require a current to be sensed through a current sense resistor.

SUMMARY

A step-down switching regulator with an inductor and a converter integrated circuit (IC) regulates output current without sensing a current external to the converter IC. The output current can be used to charge a battery or to power a light emitting diode (LED). The converter IC has a power switch and a bootstrap power generator. The switching regulator generates a set current that is indicative of a predetermined current level to which the output current is regulated. The set current is generated using a resistor outside the converter IC. In another embodiment, the set current is generated by programming a register inside the converter IC.

The switching regulator generates a sense current whose magnitude is proportional to an inductor current flowing through a power switch during an on time of the power switch. The inductor current ramps up through the inductor during the on time and ramps down during an off time. The on time has a first time period and a second time period. During the first time period, the magnitude of the sense current is less than the magnitude of the set current. During a second time period, the sense current has a magnitude that is greater than that of the set current. The output current of the switching regulator is maintained at the predetermined current level such that the first time period is a fixed proportion of the second time period when the output current equals the predetermined current level. The switching regulator maintains the first time period at the fixed proportion of the second time period using a single signal indicative of the relative proportions of the first time period and the second time period. In one embodiment, the first time period equals the second time period when the output current equals the predetermined current level. In one embodiment, the single signal is a digital signal.

The set current is compared to the sense current in circuitry inside the rails of the bootstrap power generator. In one embodiment, a voltage differential of five volts is maintained between the rails of the bootstrap power generator, while the voltage of the bottom switch rail fluctuates with the voltage across the inductor. The switching regulator also maintains an output voltage at a predetermined voltage level when the output current is less than the predetermined current level.

A power converter includes an inductor and a converter IC. The converter IC has a power switch and a replica switch. An inductor current flows through the power switch and through the inductor. The converter IC includes a latch that outputs a switching signal that controls the state of the power switch. The inductor current stops increasing through the inductor when the power switch is turned off. A sense current flowing through the replica switch has a magnitude that is proportional to the magnitude of the inductor current during an on time of the power switch. The power converter generates a reference current using a resistor outside the converter IC. In another embodiment, the reference current is generated by programming a register in the integrated circuit. The sense current has a magnitude that is less than that of the reference current during a first time period. The magnitude of the sense current is greater than that of the reference current during a second time period. The power converter maintains an output current at a predetermined current level such that the first time period equals the second time period when the output current equals the predetermined current level. The output current of the power converter can charge a battery or power a light emitting diode.

In another embodiment, a power converter includes a converter IC, an inductor and means for maintaining an average output current at a fixed current level without sensing a current external to the converter IC. The power converter outputs a ripple current that flows through the inductor and that has a peak magnitude and a valley magnitude. The average output current is the average of the peak magnitude and the valley magnitude. A ripple magnitude is the difference between the peak magnitude and the valley magnitude. The means maintains the average output current at the fixed current level that does not change as the ripple magnitude varies.

The means includes a main switch and a replica switch. A main current flows through the main switch, and a sense current flows through the replica switch. The sense current has a magnitude that is indicative of the magnitude of the average output current. Both the main current and the sense current contribute to the ripple current. The means senses the sense current without sensing the magnitude of the sense current flowing through a resistor.

The means generates a set current that is indicative of the fixed current level. The sense current increases throughout an on time of the main switch, and the sense current ramps up to reach the set current at a first time. A second time occurs when a predetermined portion of the on time has elapsed. In one embodiment, the second time occurs when three quarters of the on time has elapsed. The means regulates the average output current such that the second time occurs at the first time.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
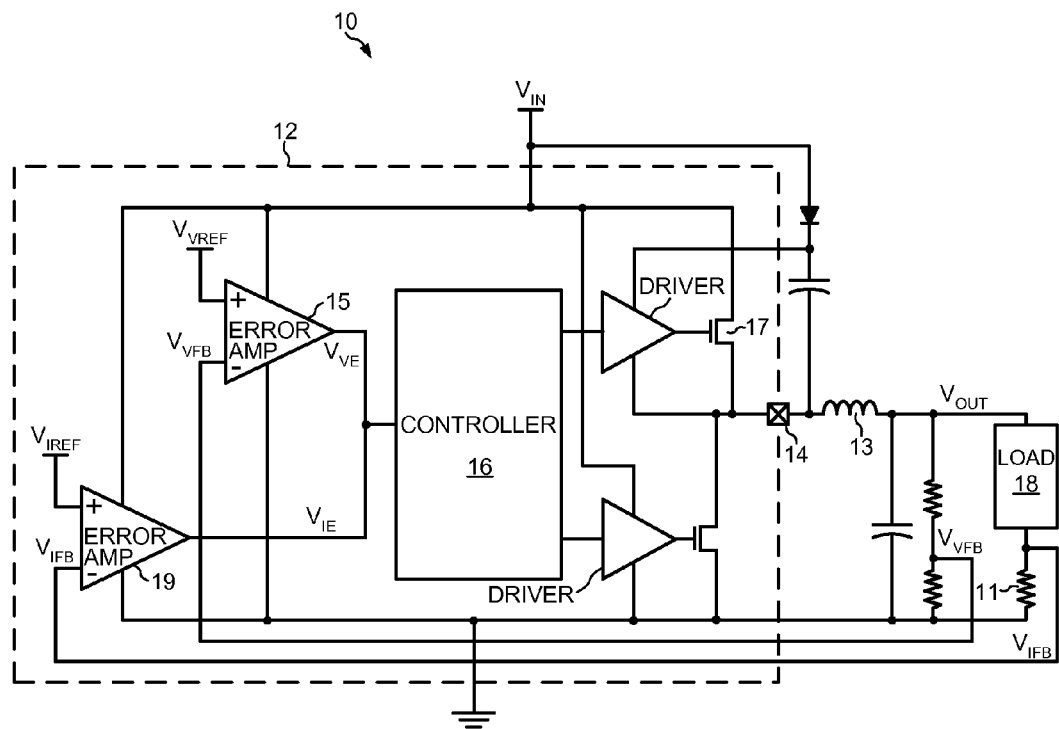
FIG. 1 (prior art) is a simplified schematic diagram of a conventional switching regulator with a current sense resistor outside of a converter integrated circuit (IC).
Figure 2:
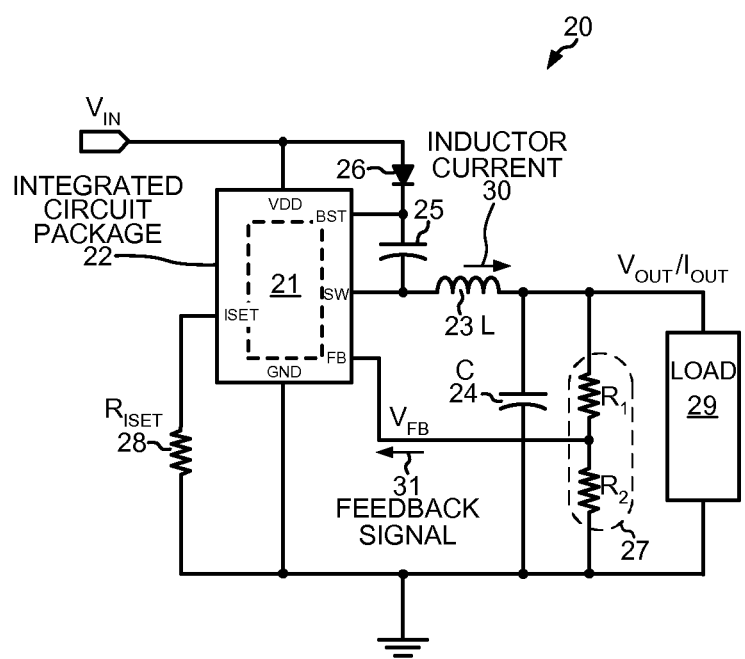
FIG. 2 is a simplified schematic diagram of a step-down power converter that accurately regulates output current without using a current sense resistor external to its converter IC.

FIG. 2 is a diagram of a switching regulator 20 that is a step-down (buck) power converter. Switching regulator 20 includes a converter integrated circuit (IC) 21 packaged in an integrated circuit package 22. Switching regulator 20 accurately regulates output current without using a current sense resistor that is external to converter IC 21. Although the term "integrated circuit" is commonly used to denote both an integrated circuit and the integrated circuit package in which the integrated circuit is housed, the term "integrated circuit" as used herein denotes only the integrated circuit die. In addition to converter IC 21, switching regulator 20 includes an inductor 23, an output capacitor 24, a bootstrap capacitor 25, a bootstrap rectifier 26, a voltage divider resistor network 27, and a current set resistor ($R_{ISET}$) 28. The current flowing through inductor 23 charges a load 29. Current set resistor $R_{ISET}$ 28 is used to set the desired output current.

In one embodiment, the input voltage $V_{IN}$ to switching regulator 20 is the direct current voltage from a cigarette lighter in a car. The current and voltage output by switching regulator 20 are used to charge a portable electronic consumer device, such as a cell phone, a personal digital assistant (PDA), a laptop computer or a DVD player. When a power switch in converter IC 21 is turned on, an inductor current 30 starts flowing through inductor 23. After inductor current 30 ramps up through inductor 23 and the power switch stops current from flowing to inductor 23, inductor current 30 flows out of inductor 23 and into load 29.

Converter IC 21 uses pulse width modulation (PWM) to regulate output current and voltage. To regulate output current, switching regulator 20 senses the average current flowing out of converter IC 21 via a switch (SW) bond pad. The average current is the average between the peaks and valleys of the sawtooth ripple current generated when a square wave output by the power switch in converter IC 21 is smoothed by the LC filter of inductor 23 and output capacitor 24. Switching regulator 20 accurately senses output current $I_{OUT}$ without sensing the current at load 29. To regulate output voltage, switching regulator 20 senses a feedback voltage on a feedback (FB) bond pad. A feedback signal 31 with feedback voltage $V_{FB}$ is generated by voltage divider resistor network 27.

Figure 3:
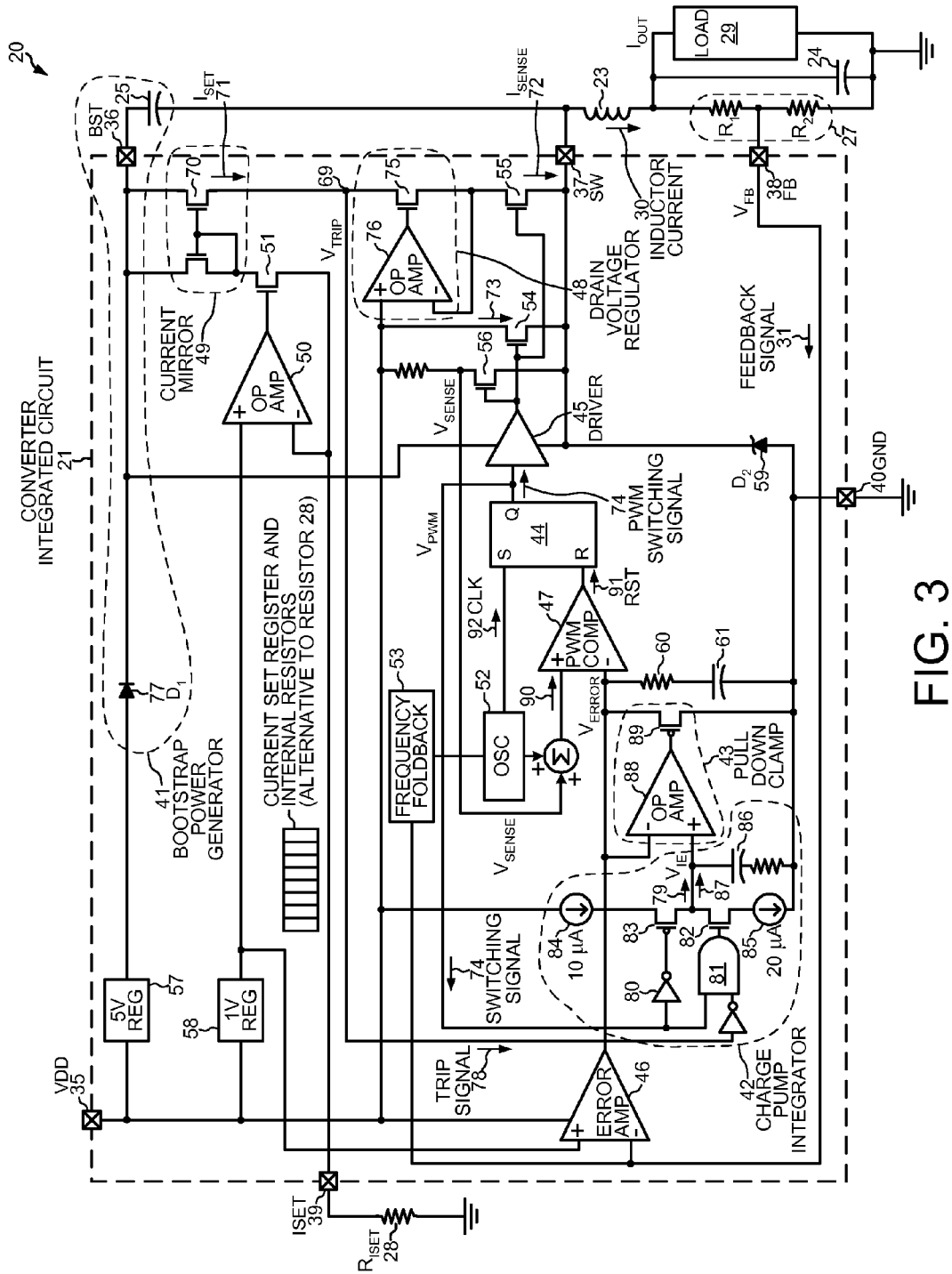
FIG. 3 is a more detailed schematic diagram of the controller IC of FIG. 2.

FIG. 3 is a more detailed schematic diagram of converter IC 21. Converter IC 21 has a power (VDD) bond pad 35, a bootstrap (BST) bond pad 36, a switch (SW) bond pad 37, a feedback (FB) bond pad 38, a current set (ISET) bond pad 39, and a ground (GND) bond pad 40. The bond pads are connected to corresponding terminals on integrated circuit package 22 by bond wires. In the embodiment of FIG. 3, bootstrap rectifier 26 of FIG. 2 has been integrated into converter IC 21 as bootstrap rectifier 77. Converter IC 21 receives an indication of the output voltage $V_{OUT}$ via feedback bond pad 38.

Converter IC 21 includes a bootstrap power generator 41, a charge pump integrator 42, a pull down clamp 43, a set-reset (SR) latch 44, a gate driver 45, a feedback error amplifier 46, a PWM comparator 47, a drain voltage regulator 48, a current mirror 49, a current set operational amplifier 50, a current set switch 51, an oscillator 52, a frequency foldback circuit 53, a power switch 54, a replica switch 55, a current sense switch 56, a first reference voltage generator 57, a second reference voltage generator 58, a Schottky diode 59, a resistor 60 and a capacitor 61. In one embodiment, all of the switches in converter IC 21 are metal-oxide semiconductor field-effect transistors (MOSFETs).

Switching regulator 20 regulates the output current $I_{OUT}$ without sensing current through a resistor at load 29. In order to regulate the output current, switching regulator 20 determines whether the time at which a sense current equals a set current occurs before or after the time at which the rising slope of inductor current 30 has reached its midpoint. As power switch 54 turns on and off, inductor current 30 resembles a sawtooth ripple current. The midpoint of the ripple current is equivalent to the magnitude of the output current $I_{OUT}$. The magnitude of the valley-to-peak current ripple (the ripple magnitude) flowing through inductor 23 can be expressed as:

$$I_{RIPPLE} = D \cdot T_s \cdot ((V_{IN} - V_{OUT})/L), \qquad (62)$$

where D is the duty cycle, Ts is the cycle time, and L is the inductance of inductor 23. Thus, the magnitude of the output current $I_{OUT}$ of switching regulator 20 equals the peak current magnitude minus half of the ripple magnitude. Switching regulator 20 adjusts the pulse width such that the time at which the rising inductor current 30 has reached the midpoint between the valley magnitude and the peak magnitude occurs at the same time at which an increasing sense current equals a set current.

Figure 4:
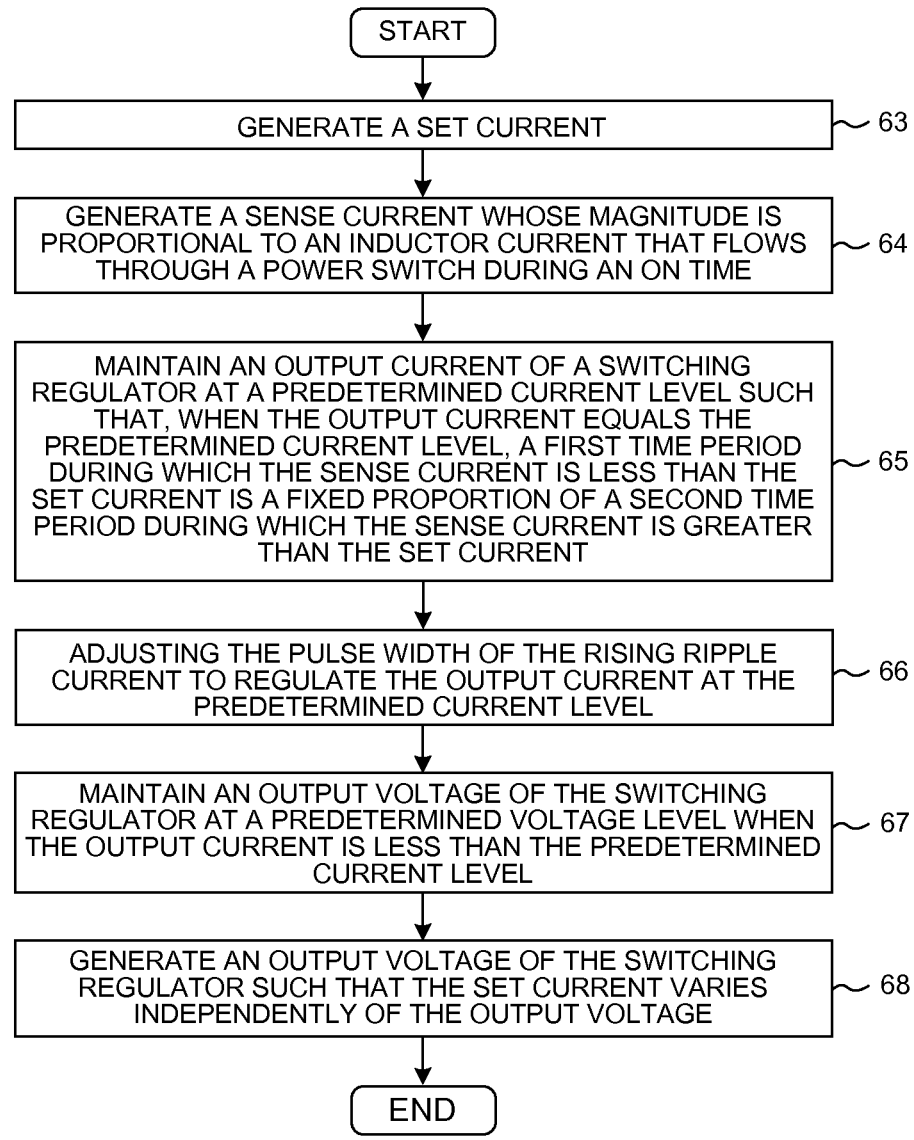
FIG. 4 is a flowchart of a method for controlling the output current and voltage of the switching regulator of FIG. 2.

FIG. 4 is a flowchart illustrating steps 63-68 of a method of operation of the switching regulator 20 of FIG. 3. The method controls the output voltage $V_{OUT}$ of switching regulator 20 by adjusting the pulse width of the ripple of inductor current 30. The method also controls the output current $I_{OUT}$ of switching regulator 20 by adjusting the pulse width of the inductor current 30. In some applications, it is desirable for the output current $I_{OUT}$ of switching regulator 20 to be maintained at a constant level. For example, before a battery is fully charged, it is desirable to maintain the charging current at a maximum level. By regulating the midpoint of the ripple current, switching regulator 20 maintains a constant output current that is independent of the ripple magnitude. As shown by equation 62 above, the ripple magnitude is dependent on inductance, switching frequency, duty cycle and the magnitudes of the input and output voltages. Thus, switching regulator 20 regulates the output current $I_{OUT}$ at a level that is independent of variations in the inductance of inductor 23 and independent of the ripple magnitude and ripple ramp rate.

In a first step 63, converter IC 21 generates a set current that determines the predetermined level at which the output current $I_{OUT}$ is maintained. The user of switching regulator 20 sets the predetermined level of the output current by choosing the resistance of current set resistor $R_{ISET}$ 28. In an alternative embodiment, the current set resistor is integrated into converter IC 21 and is programmable. By programming a current set register, the number of resistors that are coupled in series to achieve a desired total resistance is programmable. The current set register is a group of storage elements, such as flip-flops or latches, that are programmed to store digital values. In yet another embodiment, the set current is generated by forcing an external current or an external voltage onto current set bond pad ISET 39.

In the embodiment of FIG. 3, a 1-volt reference signal generated by second reference voltage generator 58 is used together with current set operational amplifier 50 and current set switch 51 to regulate current set bond pad ISET 39 to one volt. The current flowing through current set bond pad ISET 39 is passed up to a level-shifted bootstrap rail of bootstrap power generator 41 and is mirrored by current mirror 49 onto a compare node 69. The mirrored current flowing out of a transistor 70 of current mirror 49 is a set current 71 that sets the predetermined current level of switching regulator 20. To the extent that the resistance of current set resistor $R_{ISET}$ 28 varies with temperature, an equal and opposite temperature-dependent current is added to the current flowing through set bond pad ISET 39 in order to reduce any variations in set current 71 with varying temperature.

In step 64, a sense current 72 is generated that is indicative of the magnitude of the inductor current 30. Sense current 72 is generated by replica switch 55 and is directly compared to set current 71 without using a separate comparator element. Sense current 72 is proportional to a main switching current 73 that flows through power switch 54 when power switch 54 is turned on by a PWM switching signal 74. Current flows through Schottky diode 59 when power switch 54 is turned off. In an alternative embodiment, Schottky diode 59 is located outside of converter IC 21. Replica switch 55 is chosen to be a small proportion of the size of power switch 54. In one embodiment, power switch 54 is 10,000 times larger than replica switch 55. Thus, sense current 72 is 100 microamps when main switching current 73 is one amp.

The conductor connecting the drain of power switch 54 to power bond pad VDD 35 has a finite resistance, so the voltage on the drain of power switch 54 is a little below the power level $V_{DD}$. A voltage setting transistor 75 and an operational amplifier 76 of drain voltage regulator 48 are used to set the voltage on the drain of replica transistor 55 to the same level as the voltage on the drain of power switch 54. By maintaining equal drain voltages, sense current 72 remains the same proportion of main switching current 73 as the relative sizes of the transistors.

In order to maintain at least one gate-source cutoff voltage ($V_{GS}$) that keeps power switch 54 on as the voltage on switch bond pad 37 increases when current ramps up through inductor 23, bootstrap power generator 41 generates a floating power source that rises together with the switching voltage on switch bond pad 37. In one embodiment, the voltage on bootstrap bond pad 36 is maintained at five volts above the voltage on switch bond pad 37 by external bootstrap capacitor 25 and a bootstrap rectifier 77. Thus, bootstrap power generator 41 enables driver 45 to drive the gate of power switch 54 above the input voltage $V_{IN}$ to converter IC 21.

In step 65, the output current of switching regulator 20 is maintained at the predetermined current level by comparing a first time period during which set current 71 is larger than sense current 72 to a second time period during which set current 71 is smaller than sense current 72. When power switch 54 is first turned on by PWM switching signal 74, sense current 72 begins ramping up. Thus, set current 71 is larger than sense current 72, and current accumulates on compare node 69. The accumulating current on compare node 69 generates a trip voltage $V_{TRIP}$ that resembles a digital high. At the point in time when sense current 72 ramps up past the magnitude of set current 71, sense current 72 acts as a pull-down current and pulls the trip voltage $V_{TRIP}$ to near the voltage of switch bond pad 37, which resembles a digital low. Thus, current mirror 49, drain voltage regulator 48 and replica switch 55 comprise current sensing circuitry that generates a digital trip signal 78 indicative of when sense current 72 exceeds set current 71. This active current sensing circuitry is placed between the bootstrap rails of bootstrap bond pad 36 and switch bond pad 37 that maintain a floating voltage differential of five volts. In this manner, the inductor current 30 can be more accurately sensed than by attempting to sense a voltage on the input lead of inductor 23 that fluctuates at a high rate. The digital high of trip signal 78 fluctuates with the voltage on bootstrap bond pad 36, and the digital low of trip signal 78 fluctuates at about two gate-to-source voltages ($V_{GS}$) above the voltage on switch bond pad 37.

Figure 5:
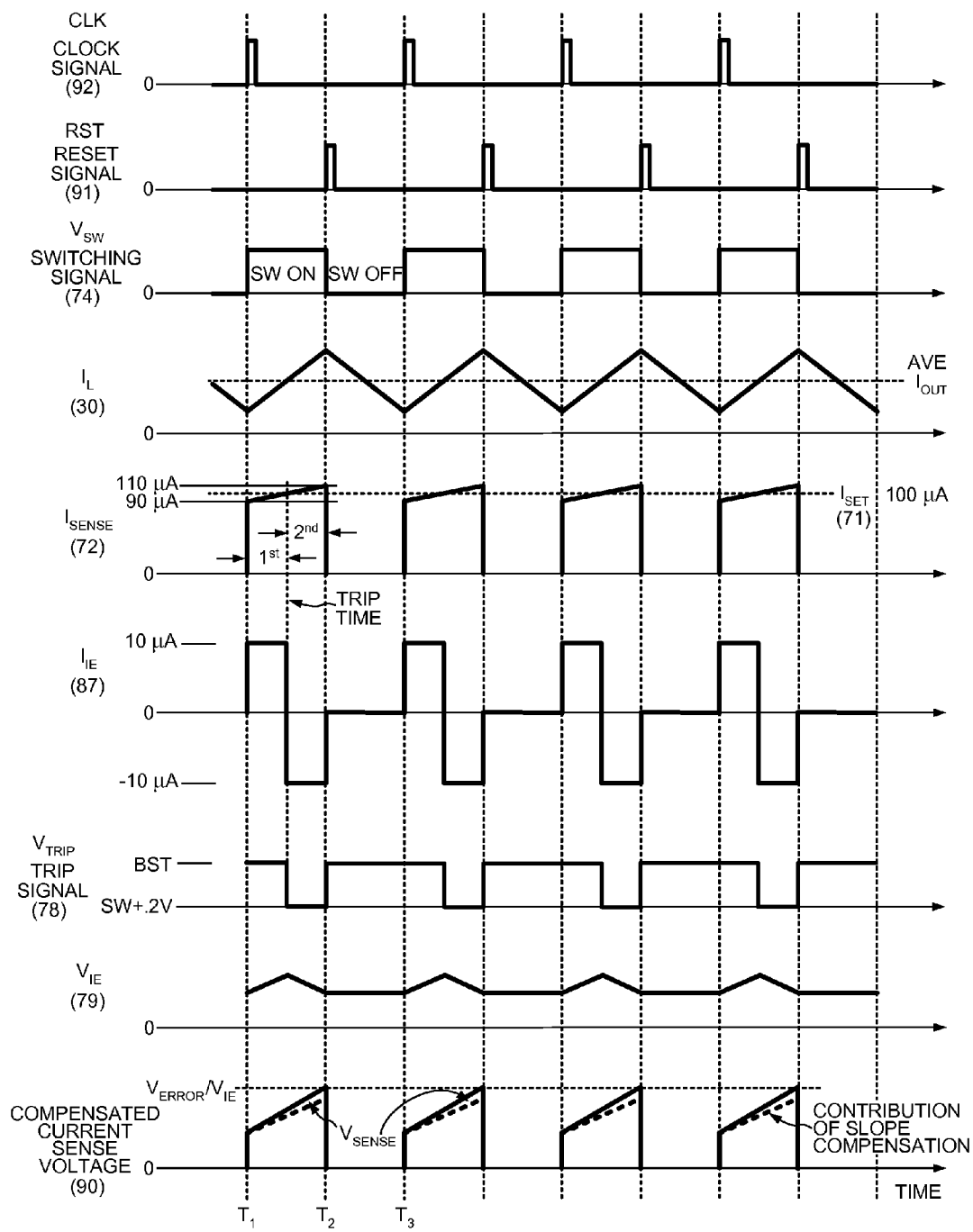
FIG. 5 is a diagram showing idealized waveforms that illustrate the operation of the switching regulator of FIG. 2 while performing the method of FIG. 4.

FIG. 5 shows idealized waveforms on various nodes of switching regulator 20. The waveforms illustrate the operation of switching regulator 20 during the method of FIG. 4. Power switch 54 turns on at $T_1$, turns off at $T_2$, and turns on again at $T_3$. At $T_1$, inductor current 30 begins ramping up through inductor 23. Thus, the time between $T_1$ and $T_2$ is the on time, and the time between $T_1$ and $T_3$ is the cycle time. FIG. 5 illustrates one embodiment in which sense current 72 jumps to ninety microamps when power switch 54 turns on and then ramps from ninety microamps to one hundred ten microamps during the on time. In this embodiment, set current 71 is set at one hundred microamps. The trip time is the time at which the magnitude of the ramping sense current 72 passes the stable set current 71. At the trip time, trip signal 78 is deasserted.

The first time period during which sense current 72 is less than set current 71 is then compared to the second time period during which sense current 72 is greater than set current 71. When the magnitude of sense current 72 is at the midpoint of its rising slope and therefore also at the predetermined level chosen for the average output current, the first time period and the second time period are equal. Charge pump integrator 42 compares the first time period to the second time period by adding current to a current error node during the first time period and subtracting current at the same rate from the current error node during the second time period. The change in the voltage ($V_{IE}$) of a current error signal 79 present on the current error node indicates which period is longer and how far the trip time is from the midpoint of the ramping sense current 72.

FIG. 3 shows that charge pump generator 42 receives PWM switching signal 74 and trip signal 78 and outputs current error signal 79. Charge pump generator 42 includes an inverter 80, an AND gate 81, an n-channel FET 82, a p-channel FET 83, a pull-up current source 84, a pull-down current source 85 and a capacitor 86. In the embodiment of FIG. 3, pull-down current source 85 is twice the magnitude of pull-up current source 84. Inverter 80 and AND gate 81 control FETs 82 and 83 such that the switches are on only when switching signal 74 is asserted and current is ramping up through inductor 23. The current error voltage $V_{IE}$ remains unchanged while FETs 82 and 83 are off during the off time of power switch 54. Only p-channel FET 83 is on during the first time period while switching signal 74 is asserted and before trip signal 78 is deasserted. During the first time period, pull-up current source 84 supplies ten microamps of current ($I_{IE}$) 87 onto the current error node, and the voltage $V_{IE}$ of current error signal 79 rises, as illustrated in FIG. 5. When trip signal 78 is deasserted, FET 83 remains on, and FET 82 also turns on. During the second time period, pull-up current source 84 continues to supply ten microamps of current $I_{IE}$ 87 onto the current error node, but pull-down current source 85 sinks twenty microamps of current $I_{IE}$ 87 from the current error node. Thus, a total of ten microamps is drained from the current error node during the second time period. When the first time period is equal to the second time period, an equal amount of current is supplied to and drained from the current error node, and the current error voltage $V_{IE}$ returns to its previous level by the end of the on time. Capacitor 86 is used to smooth the level of the current error voltage $V_{IE}$.

In step 66, the pulse width (the rising slope of the ripple current) of inductor current 30 is adjusted to regulate the output current at the predetermined current level. In one example of how converter IC 21 regulates output current, the output current is below the predetermined current level. Thus, sense current 72 reaches set current 71 too late, and the first time period becomes longer than the second time period. As a consequence, more current is supplied to the current error node during the first time period than is drained from the current error node during the second time period, and the current error voltage $V_{IE}$ rises. The increased current error voltage $V_{IE}$ causes the pulse width of the PWM switching signal 74 to increase, and the output current increases towards the predetermined current level.

Pull down clamp 43 includes an operational amplifier 88 and a p-channel FET 89. In the constant current mode, pull down clamp 43 pulls an error voltage ($V_{ERROR}$) down to the level of the current error voltage $V_{IE}$. In the constant current mode, the voltage-regulation loop is always under regulation. In the constant voltage mode, when the current error voltage $V_{IE}$ is above the error voltage $V_{ERROR}$, pull-down clamp 43 has no affect on the error voltage $V_{ERROR}$. Resistor 60 and capacitor 61 smooth the level of the error voltage $V_{ERROR}$.

The PWM switching signal 74 is generated by determining when a compensated current sense voltage 90 reaches the error voltage $V_{ERROR}$. A current sense voltage $V_{SENSE}$ is the voltage on the drain of current sense switch 56. Like replica switch 55, current sense switch 56 is many times smaller than power switch 54, and the gates of switches 54, 55 and 56 are all coupled to the output of gate driver 45. Compensated current sense voltage 90 is generated by summing current sense voltage $V_{SENSE}$ with a slope compensation signal. Slope compensation signal is generated by oscillator 52. FIG. 5 illustrates how the current sense voltage $V_{SENSE}$ adds to the slope compensation signal to form compensated current sense voltage 90.

PWM comparator 47 determines when the ramping compensated current sense voltage 90 reaches the level of the error voltage $V_{ERROR}$ (or the error voltage pulled down to the current error voltage $V_{IE}$). FIG. 5 illustrates that a reset signal (RST) 91 output by PWM comparator 47 resets SR latch 44 and terminates the on time by deasserting switching signal 74 present on the Q output of SR latch 44. Switching signal 74 is asserted when the pulse of a clock signal (CLK) 92 output by oscillator 52 is received onto the set input of SR latch 44. In the constant current mode, reset signal 91 resets SR latch 44 when the ramping compensated current sense voltage 90 reaches the level of error voltage $V_{ERROR}$. When the current error voltage $V_{IE}$ has been increased as a result of the first time period being longer than the second time period, it takes longer for the ramping compensated current sense voltage 90 to reach the error voltage $V_{ERROR}$. Consequently, the on time of switching signal 74 is extended, and inductor current 30 is allowed to ramp up for a longer time through inductor 23. The midpoint of the longer rising slope of the ripple current is raised, and the magnitude of the output current $I_{OUT}$ that was below the predetermined current level is increased.

In step 67, the output voltage of switching regulator 20 is maintained at a predetermined voltage level when the output current is less than the predetermined current level. In the typical charging cycle of a battery, the charging begins in the constant current mode and then transitions to the constant voltage mode as the battery becomes fully charged. The heavy load of an empty battery tries to pull current in excess of the predetermined current limit, and switching regulator 20 limits the output current by reducing the current error voltage $V_{IE}$. As the load of the battery becomes lighter and pulls less current, the current error voltage $V_{IE}$ rises above the error voltage $V_{ERROR}$, and switching regulator 20 limits the output voltage to a predetermined level set by the error voltage $V_{ERROR}$.

Figure 6:
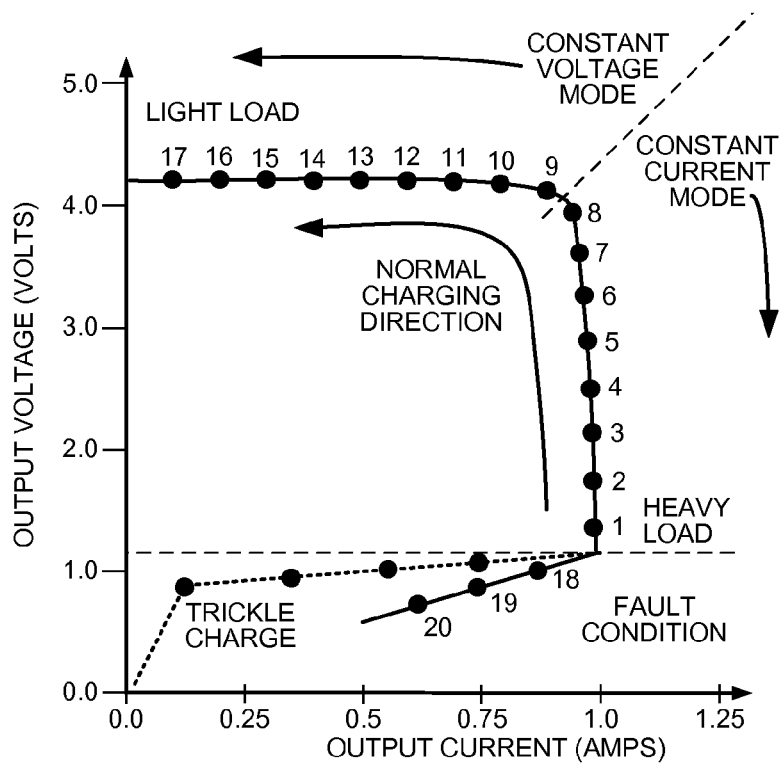
FIG. 6 is a graph of output voltage versus output current as the switching regulator of FIG. 2 charges a typical battery.

FIG. 6 is a graph of output voltage versus output current as switching regulator 20 charges a typical lithium ion battery in a cell phone. The points illustrate representative switching cycles of inductor current 30. The charging begins in the constant current mode at point #1, and switching regulator 20 regulates the output current to about one amp of current. The charging cycle enters the constant voltage mode at point #9. As the cell phone battery charges and the load from the cell phone battery decreases, switching regulator 20 reduces the pulse width and output current through point #17 in order to limit the output voltage to about 4.2 volts. In one embodiment, switching regulator 20 operates in a "top-off mode" in which once point #17 is reached, the battery is charged for an additional ten minutes at one-tenth of the fully charging current, and then switching is turned off.

A fault condition occurs where the output voltage falls below the fault threshold represented by point #18-20 under the dashed line. When the output voltage falls below the fault threshold, the voltage ($V_{FB}$) present on feedback bond pad 38 drops below an under-voltage lockout turn-off threshold, and the output current is adjusted to fall to zero linearly along points #18-20. In another embodiment, the current folds back non-linearly (as depicted by the points along the dashed line) when the output voltage falls below the fault threshold. When the user chooses this trickle charge mode, output current is folded back to a trickle as soon as the lower voltage threshold is reached. In yet another embodiment, switching regulator 20 has a time-out function that stops the switching of power switch 54 if the charging has not exited the trickle charge mode within a maximum charging time, such as one hour.

In this example of step 67, the user of switching regulator 20 sets the predetermined voltage level to the maximum charged voltage for a lithium ion battery of 4.2 volts. The predetermined voltage level is set by choosing the resistances of resistors R1 and R2 of voltage divider resistor network 27. Voltage divider 27 divides the desired 4.2-volt maximum charge on load 29 to a one-volt level on feedback bond pad FB 38. Error amplifier 46 compares the voltage $V_{FB}$ of feedback signal 31 to a one-volt reference voltage generated by second reference voltage generator 58. Error amplifier 46 outputs the error voltage $V_{ERROR}$, whose magnitude is proportional to the difference between the feedback voltage $V_{FB}$ and the one-volt reference voltage.

As the voltage across load 29 increases during the charging cycle, the difference between the feedback voltage $V_{FB}$ and the one-volt reference voltage decreases. Consequently, the error voltage $V_{ERROR}$ decreases. At the point where the error voltage $V_{ERROR}$ decreases below the current error voltage $V_{IE}$, switching regulator 20 transitions from constant current mode into constant voltage mode. This transition occurs between points #8 and #9 in FIG. 6.

Figure 7:
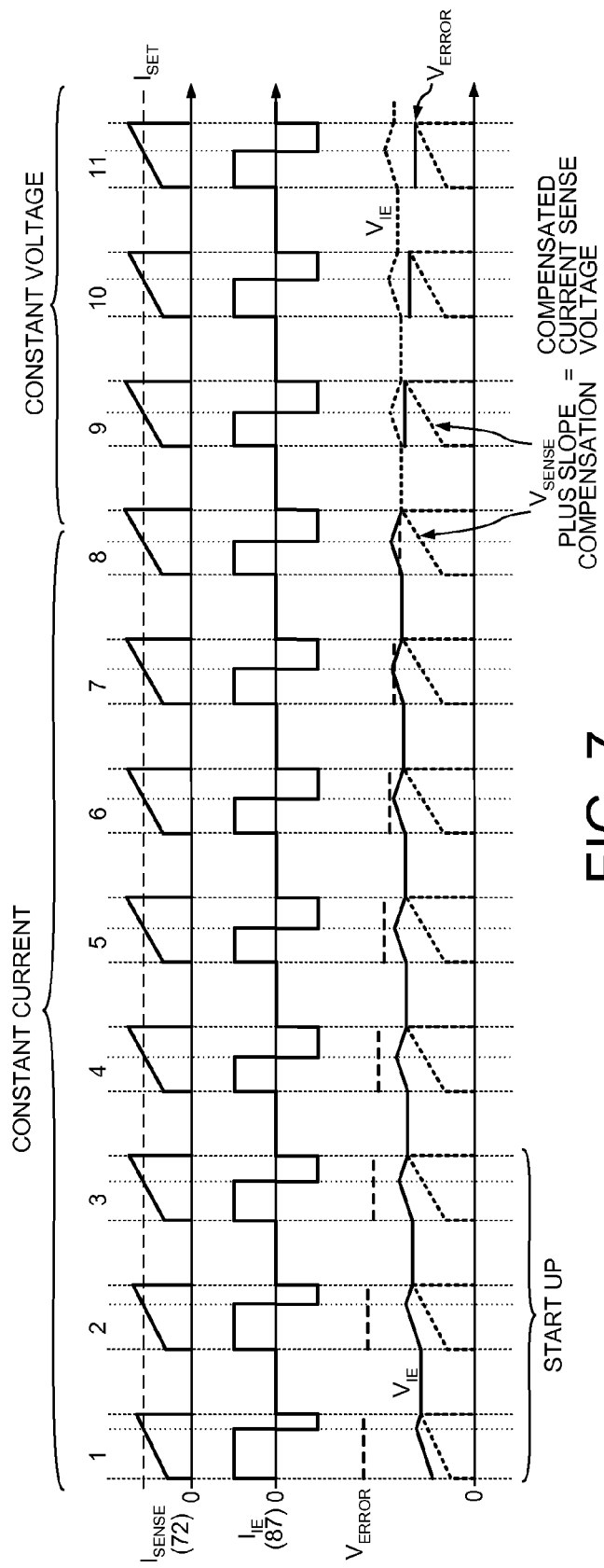
FIG. 7 is a diagram showing waveforms that illustrate how the switching regulator of FIG. 2 adjusts the pulse width frequency so as to maintain a predetermined current level and a predetermined voltage level.

FIG. 7 shows idealized waveforms illustrating the transition from constant current mode into constant voltage mode. The numbered cycles in FIG. 7 correspond to the points in FIG. 6. In a start-up phase (cycles #1-#3), the first time period is longer than the second time period, and charge pump integrator 42 supplies more current $I_{IE}$ 87 onto the current error node than it drains. The current error voltage $V_{IE}$ increases, which increases the pulse width of switching signal 74. The output current increases and reaches the predetermined current level by cycle #4, by which time the first time period equals the second time period. In typical operation, current error voltage $V_{IE}$ reaches a steady state within a few milliseconds. The output current then remains in a steady state until the output voltage approaches the predetermined voltage level. As the battery charges and the voltage across load 29 increases, the error voltage $V_{ERROR}$ decreases. After the error voltage $V_{ERROR}$ falls below the current error voltage $V_{IE}$, the on time of power switch 54 is terminated when the compensated current sense voltage 90 reaches the lower error voltage $V_{ERROR}$ and resets SR latch 44. Thus, the output voltage of switching regulator 20 is maintained at the predetermined voltage level when the output current is less than the predetermined current level.

In a step 68, switching regulator 20 regulates the output current independently of output voltage. The magnitude of set current 71 does not vary with varying output voltage. Because set current 71 is generated by a fixed 1-volt reference and current sensing circuitry between the bootstrap rails maintains a floating voltage differential of five volts, switching regulator 20 generates an output voltage such that set current 71 varies independently of the output voltage.

Switching regulator 20 has frequency foldback functionality. Clock signal CLK 92 determines the switching frequency at which switching signal 74 begins the ramping of each new ripple of inductor current 30. Switching regulator 20 operates in continuous conduction mode such that current starts to ramp up through inductor 23 at the beginning of each new cycle before inductor current 30 has completely ramped down out of inductor 23. In normal operation, the switching frequency and cycle time remain constant, and the pulse width of the rising slope of the ripple current is modulated to achieve the desired output current and voltage. For loads so heavy that the output voltage approaches zero, the pulse width of the on time becomes shorter and shorter. A minimum amount of time is required, however, for trip signal 78 to detect when the magnitude of the rising sense current 72 exceeds the magnitude of set current 71. At very low output voltages, the pulse width of switching signal 74 could become shorter than the response time of trip signal 78, in which case the current comparison would be erroneous, and switching regulator would provide no current regulation. In order to avoid this situation, frequency foldback circuitry 53 decreases (folds back) the frequency of switching signal 74 when the feedback voltage $V_{FB}$ is much lower than the predetermined voltage level. At the slower switching frequency, the same current is output with a longer pulse width that does not become shorter than the response time of trip signal 78.

Figure 8:
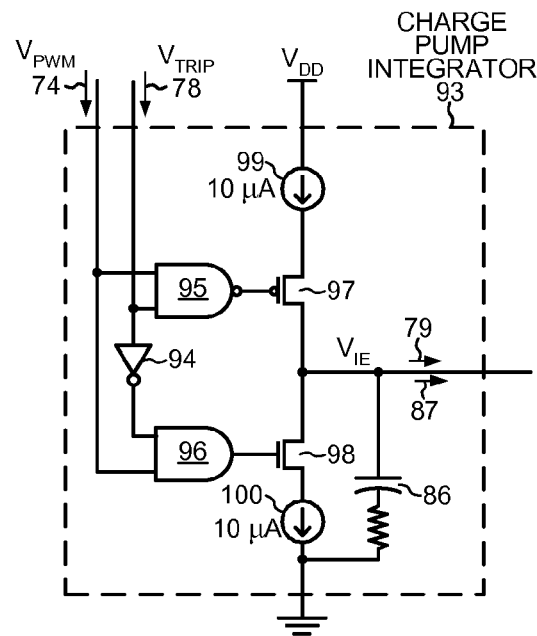
FIG. 8 is a schematic diagram of another embodiment of the charge pump integrator that is part of the converter IC of FIG. 3.

FIG. 8 shows another embodiment of a charge pump integrator 93. In the embodiment of FIG. 3, pull-down current source 85 is twice the size of pull-up current source 84 in order to reduce the amount of logic circuitry that is used to switch from pull-up current to pull-down current. Although charge pump integrator 93 uses more logic circuitry than charge pump integrator 42 of FIG. 3, charge pump integrator 93 has equal pull-up and pull-down currents. Thus, charge pump integrator 93 operates using less current. Charge pump generator 93 includes an inverter 94, a NAND gate 95, an AND gate 96, a p-channel FET 97, an n-channel FET 98, a pull-up current source 99, a pull-down current source 100 and capacitor 86.

Both current sources 99 and 100 supply ten microamps of current. During the first time period, pull-up current source 84 supplies ten microamps of current ($I_{IE}$) 87 onto the current error node. When trip signal 78 is deasserted, FET 97 is turned off, and FET 98 turns on. During the second time period, only pull-down current source 100 drains ten microamps of current $I_{IE}$ 87 from the current error node. Thus, charge pump integrator 93 uses twenty microamps less than charge pump integrator 42 during the second time period. But just as for charge pump integrator 42, charge pump integrator 93 supplies an equal amount of current to the current error node as it sinks when the first time period is equal to the second time period.

Figure 9:
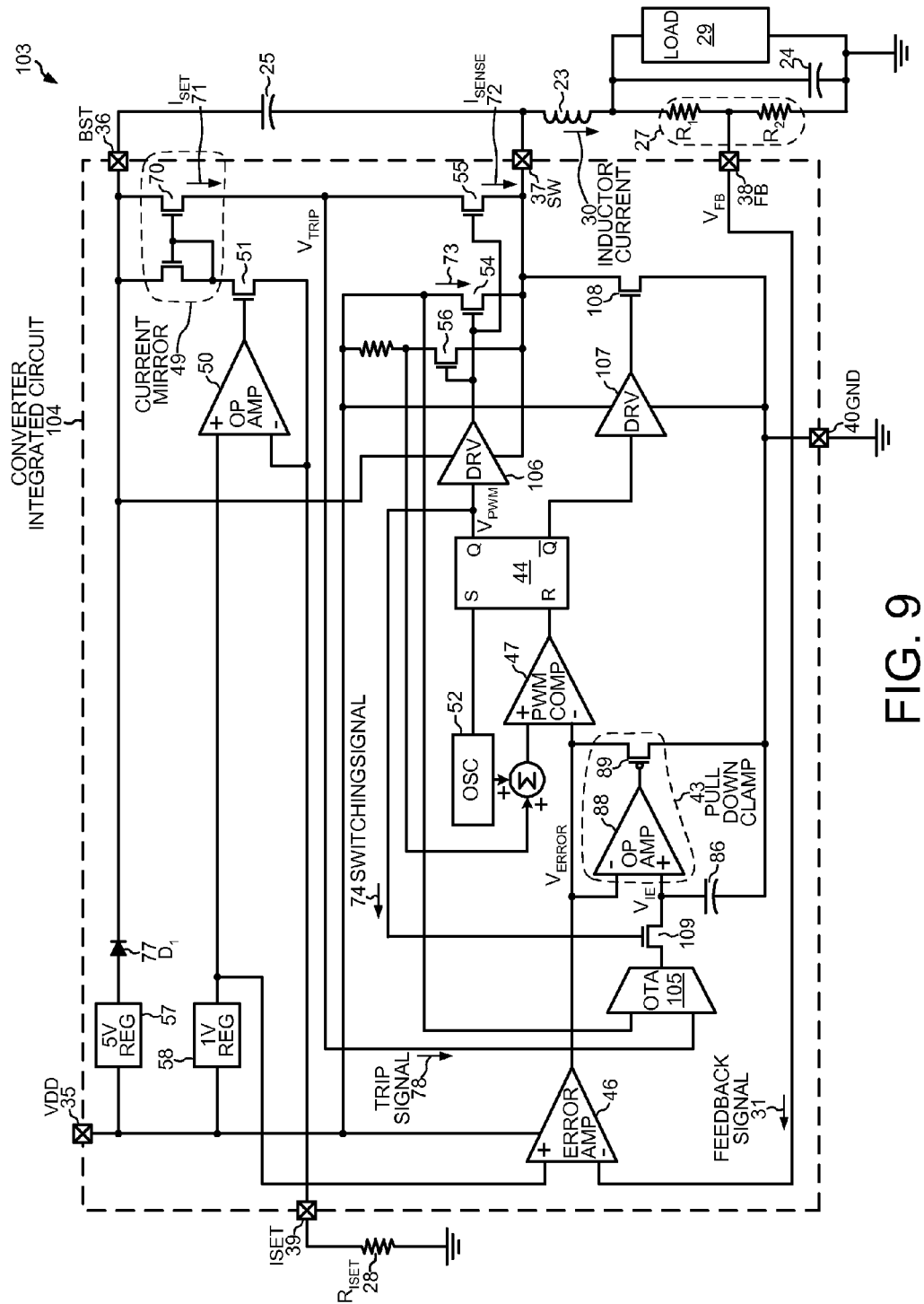
FIG. 9 is a schematic diagram of another embodiment of a switching regulator that has two power switches and that accurately regulates output current without using an external current sense resistor.

FIG. 9 shows another embodiment of a switching regulator that accurately regulates output current without using a current sense resistor that is external to the converter IC. A switching regulator 103 includes a converter IC 104 that is similar to converter IC 21 of FIG. 3. Unlike converter IC 21, however, converter IC 104 includes two power switches and an operational transconductance amplifier (OTA) 105.

An upper gate driver 106 and power switch 54 function analogously to gate driver 45 and power switch 54 of converter IC 21. A lower gate driver 107 and a lower power switch 108, however, replace Schottky diode 59. Because lower gate driver 107 and lower power switch 108 occupy more space than does Schottky diode 59, the die size of converter IC 104 is larger and therefore more costly than converter IC 21. During the off time of power switch 54, current is drained from inductor 23 through switch 108 instead of through Schottky diode 59. Because current drains through switch 108, however, inductor current 30 could be sensed on the lower side of switch bond pad 37 in an alternative embodiment of converter IC 104. The current sense circuitry of the alternative embodiment would be less complicated than the current sensing circuitry that is placed between the floating bootstrap rails of the bootstrap current generator because the voltage on the drain of switch 108 does not float together with the bootstrap voltage. Placing the current sense circuitry of converter IC 21 inside the bootstrap rails allows the cheaper Schottky diode 59 to be used in place of lower gate driver 107 and lower power switch 108 of converter IC 104.

Converter IC 104 integrates the trip voltage provided by trip signal 78 in an analog manner, whereas charge pump integrator 42 of converter IC 21 performs digital integration of the digital voltage of trip signal 78. OTA 105 and capacitor 86 integrate the difference between the trip voltage $V_{TRIP}$ and a sense voltage across power switch 54. During the time that the trip voltage is higher than the sense voltage, OTA 105 supplies a current onto capacitor 86 proportional to the magnitude of the difference. During the time that the trip voltage is lower than the sense voltage, OTA 105 sinks a current from capacitor 86 that is proportional to the magnitude of the difference. A switch 109 is controlled by switching signal 74 such that the difference between the set and sense voltages is integrated only during the on time of power switch 54.

Although converter IC 104 uses two n-channel FETs (NMOS) 54 and 108 as power switches, a p-channel FET (PMOS) can be used as power switch 54 in an alternative embodiment. When a p-channel FET is used for power switch 54, no bootstrap generator is required because the gate of power switch 54 need not be maintained at least one $V_{GS}$ above the floating voltage on switch bond pad 37. A p-channel FET is larger than an n-channel FET, however, so the die size of the alternative embodiment that uses a PMOS device would be larger and thus more costly.

Figure 10:
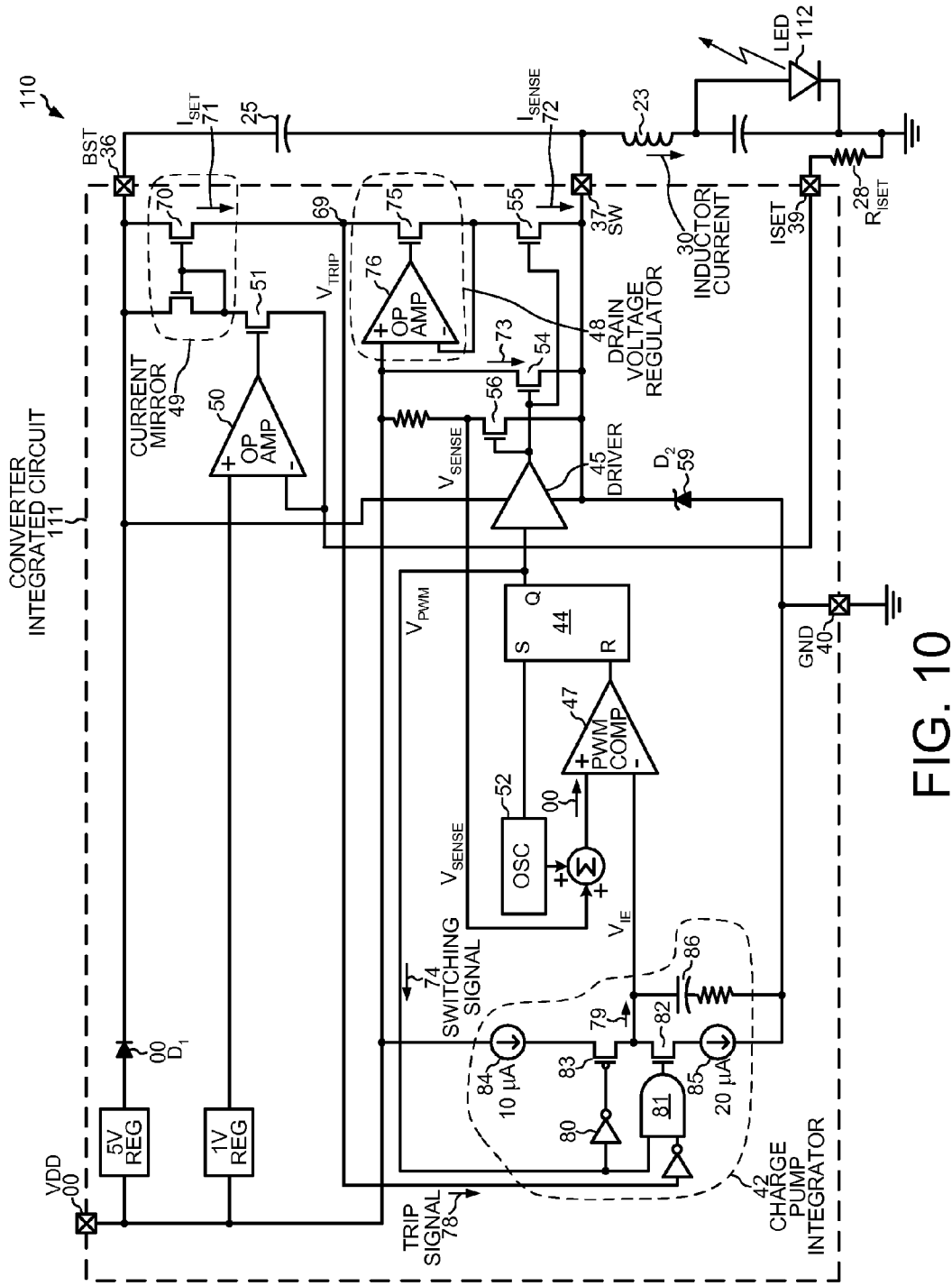
FIG. 10 is a schematic diagram of yet another embodiment of a switching regulator that accurately regulates output current without using an external current sense resistor and that powers a light emitting diode (LED).

FIG. 10 shows yet another embodiment of a switching regulator 110 that does not sense a current external to a converter IC 111 in order accurately to regulate output current. Although load 29 has been described in relation to converter IC 21 of FIG. 3 as a lithium ion battery of a cell phone that is being charged, load 29 need not be a battery. In the embodiment of FIG. 10, converter IC 111 adjusts inductor current 30 such that the output current of switching regulator 110 is suitable for powering a light emitting diode (LED) 112.

Some LEDs have a longer useful life when they do not operate above a predetermined temperature. Converter IC 111 reduces the average output current of switching regulator 110 as the temperature of LED 112 increases. The temperature of LED 112 is thereby held below the predetermined temperature limit. In the embodiment of FIG. 10, current set resistor $R_{ISET}$ 28 is a thermistor whose resistance increases with increasing temperature. Current set resistor 28 is placed physically close to LED 112 such that as the temperature of LED 112 increases, so too does the resistance of current set resistor 28. The increasing resistance of current set resistor 28 adjusts set current 71 such that the current error voltage $V_{IE}$ is reduced. In other embodiments, current set resistor 28 is located at a position on the printed circuit board of switching regulator 110 such that the temperature of resistor 28 reflects that temperature of the load being charged or of the an ambient temperature around the switching regulator.

In another embodiment, switching regulator 110 performs pulse-width-modulation (PWM) dimming of LED 112. In PWM dimming, inductor current 30 flowing through LED 112 is pulsed from zero to the predetermined current level. PWM dimming differs from analog dimming, in which a DC current flowing through the LED is reduced in order to achieve reduced brightness. In PWM dimming, the duty cycle of the pulses during which current flows through LED 112 determines the LED brightness. The on/off state of PWM dimming is controlled by setting an additional threshold on current set bond pad ISET 39. In an alternative embodiment, the on/off state of PWM dimming is controlled using an additional bond pad on converter IC 111. Current set bond pad ISET 39 is typically regulated to one volt, but when the bond pad is pulled up to a higher voltage, such as two volts, switching regulator 110 is temporarily disabled. PWM dimming has two advantages over analog dimming. First, efficiency is increased as the output load is either maximum or off. Second, the color balance of the LED is maintained at its optimum value because the current flowing through LED 112 is maintained at the predetermined current level for the time that LED 112 is on.

In order to avoid visible flickering, the pulse rate of the current through LED 112 is maintained at a rate higher than the response of the human eye. Typically, LED PWM dimming rates are higher than 100 Hz. However, if the LED current is large, audible noise can be emitted by the power components of the regulator circuit, such as inductor 23 and the capacitors. It is therefore preferable to choose a PWM dimming rate that is higher than the audible range of the human ear, typically 15 kHz and above.

When dimming LED 112 using a high pulse rate such as 15 kHz, any delay in the startup time of converter IC 11 is perceptible as a nonlinearity in the LED brightness versus the PWM duty cycle. It is therefore preferable to have a fast startup time, being the time between when an LED control signal is asserted and the time that the LED current reaches the predetermined current level. The slowest response in converter IC 111 is the determination of the current error voltage $V_{IE}$ in the constant current mode, which takes many switching cycles in order to reach the steady-state value of constant-current regulation. Converter IC 111 accelerates the LED startup time by maintaining the current error voltage $V_{IE}$ at the same level it was when the output of converter IC 111 was disabled. Both the pull-up and the pull-down current sources of charge pump integrator 42 are turned off when the LED control signal toggles to the off value. Thus, the precise value of current error voltage $V_{IE}$ that was previously generated is not disturbed. When the LED control signal directs the converter IC 111 to resume supplying current to LED 112, charge pump integrator 42 does not need to re-generate the current error voltage $V_{IE}$. Consequently, the output current of switching regulator 110 reaches the predetermined current level within only a few cycles.

Although the present invention has been described in connection with certain specific embodiments for instructional purposes, the present invention is not limited thereto. The embodiment of FIG. 3 compares the time at which sense current 72 equals set current 71 to the midpoint between the valley magnitude and the peak magnitude of the ripple current. In other embodiments, more than one point is compared. For example, first the time at which the magnitude of sense current 72 equals one quarter of the magnitude of set current 71 is compared to the time at which the inductor current 30 has ramped one quarter of the way from the valley magnitude to the peak magnitude. Then, the time at which the magnitude of sense current 72 equals three quarters of the magnitude of set current 71 is compared to the time at which the inductor current 30 has ramped three quarters of the way from the valley magnitude to the peak magnitude. To determine the time at which the inductor current 30 has ramped one quarter or three quarters of the way from the valley magnitude to the peak magnitude, pull-up and pull-down currents with a 3:1 ratio are used. The two comparisons are then used to generate reset signal 91 that terminates the on time.

Although the power switches of the converter ICs are described above as being switched using pulse-width-modulation (PWM), other modulation methods can be used. In an alternative embodiment, variable-frequency pulse frequency modulation (PFM) is used to generate switching signal 74. The on time of power switch 54 is kept constant for a time period that is longer than the response time required for trip signal 78 to compare set current 71 to sense current 72. The cycle time is then adjusted to achieve the desired average output current. Where a switching regulator is used in a cigarette-lighter adapter application, however, PWM modulation is preferable to PFM modulation in order to ensure that the switching frequency and any harmonics do not interfere with the frequency band of the car's AM radio or with the 455 kHz intermediate frequency (IF) typically used in RF devices such as cell phones. In the embodiment of FIG. 3, PWM modulation is used at a frequency of between 300-400 kHz, which is high enough to allow a smaller sized inductor to be used, but yet low enough not to interfere with the AM radio band. In addition, the frequency used for PWM modulation can be jittered in order to spread out the energy from the main band and the harmonics so as not to interfere with radio signals and other signals transmitted in the car.

In yet another embodiment, hysteretic modulation is used to generate switching signal 74. In hysteretic modulation, neither the on time nor the frequency is fixed, but rather the peak and valley magnitudes of inductor current 30 are regulated. Because the frequency wanders as the output current is being regulated using hysteretic modulation, it is more difficult to avoid interference with radio signals and other signals being transmitted in the car. Accordingly, various modifications, adaptations, and combinations of various features of the described embodiments can be practiced without departing from the scope of the invention as set forth in the claims.

What is claimed is:

1. A method comprising:
generating a reference current, wherein a switching regulator includes an inductor, a power switch and a bootstrap capacitor, wherein the power switch has a source, a drain and a gate and is integrated into an integrated circuit, and wherein an inductor current flows through the inductor during an on time of the power switch;
generating a sense current whose magnitude is proportional to the inductor current flowing through the power switch during the on time, wherein the sense current is generated without sensing a current external to the integrated circuit, wherein the sense current increases during the on time, and wherein during the on time the bootstrap capacitor supplies a voltage to the gate of the power switch;
maintaining an output voltage of the switching regulator at a predetermined voltage level when an output current of the switching regulator is less than a predetermined current level;
maintaining the output current at the predetermined current level when the output voltage is less than the predetermined voltage level, wherein the output current reaches the predetermined current level when a current error voltage reaches a steady state; and
determining a trip time at which the increasing sense current equals the reference current, wherein output current is maintained at a predetermined current level such that, when the output current equals the predetermined current level, a first time period before the trip time during which the sense current is less than the reference current is a fixed proportion of a second time period after the trip time during which the sense current is greater than the reference current.

2. The method of claim 1, wherein both the first time period and the second time period have non-zero durations.

3. A method comprising:
generating a reference current, wherein a switching regulator includes an inductor, a power switch and a bootstrap capacitor, wherein the power switch has a source, a drain and a gate and is integrated into an integrated circuit, and wherein an inductor current flows through the inductor during an on time of the power switch;
generating a sense current whose magnitude is proportional to the inductor current flowing through the power switch during the on time, wherein the sense current is generated without sensing a current external to the integrated circuit, and wherein during the on time the bootstrap capacitor supplies a voltage to the gate of the power switch;
maintaining an output voltage of the switching regulator at a predetermined voltage level when an output current of the switching regulator is less than a predetermined current level; and
maintaining the output current at the predetermined current level when the output voltage is less than the predetermined voltage level, wherein the output current reaches the predetermined current level when a current error voltage reaches a steady state, and wherein the current error voltage is generated by a charge pump integrator.

4. A power converter, comprising:
an inductor;
an integrated circuit with a power switch and a replica switch, wherein the power switch has a source, a drain and a gate, wherein an inductor current with a magnitude flows through the inductor during an on time of the power switch, wherein a sense current flowing through the replica switch has a magnitude that is proportional to the magnitude of the inductor current during the on time, and wherein the power converter generates the sense current without sensing a current external to the integrated circuit; and
a bootstrap capacitor, wherein during the on time the bootstrap capacitor supplies a voltage to the gate of the power switch, wherein the power converter generates an output voltage at a predetermined voltage level when an output current of the power converter is less than a predetermined current level, wherein the power converter generates the output current at the predetermined current level when the output voltage is less than the predetermined voltage level, wherein the output current reaches the predetermined current level when a current error voltage reaches a steady state, wherein the integrated circuit includes a charge pump integrator, and wherein the charge pump integrator generates the current error voltage.

5. The power converter of claim 4, wherein the power converter generates a reference current, wherein the sense current increases during the on time, and wherein the increasing sense current equals the reference current at a trip time, further comprising:
a resistor outside the integrated circuit, wherein the reference current is generated using the resistor.

6. The power converter of claim 5, wherein the resistor is a thermistor, wherein the output current varies inversely with a temperature, and wherein the temperature is taken from the group consisting of: a temperature of a load being charged by the output current, an ambient temperature around the power converter, and a temperature of a light emitting diode (LED) through which the output current flows.

7. The power converter of claim 4, wherein the power converter generates a reference current, wherein the sense current increases during the on time, wherein the increasing sense current equals the reference current at a trip time, wherein the power converter maintains the output current at the predetermined current level such that, when the output current equals the predetermined current level, a first time period before the trip time during which the sense current is less than the reference current is a fixed proportion of a second time period after the trip time during which the sense current is greater than the reference current.

8. A power converter, comprising:
an inductor, wherein an inductor current with a magnitude flows through the inductor during an on time of a power switch, and wherein a sense current flowing through a replica switch has a magnitude that is proportional to the magnitude of the inductor current during the on time;
a bootstrap capacitor; and
means for generating the sense current without sensing a current external to the means, wherein the means includes the power switch and the replica switch, wherein the power switch has a source, a drain and a gate, wherein during the on time the bootstrap capacitor supplies a voltage to the gate of the power switch, wherein the power converter generates an output voltage at a predetermined voltage level when an output current of the power converter is less than a predetermined current level, wherein the power converter generates the output current at the predetermined current level when the output voltage is less than the predetermined voltage level, wherein the means is also for generating a current error voltage that reaches a steady state when the output current reaches the predetermined current level, wherein the means includes a charge pump integrator, and wherein the charge pump integrator generates the current error voltage.

9. The power converter of claim 8, wherein the sense current increases throughout the on time, wherein the means generates a set current, wherein the means determines a trip time at which the increasing sense current equals the set current, wherein a second time occurs when a predetermined portion of the on time has elapsed, and wherein the means regulates the output current such that the trip time occurs at the second time.

10. The power converter of claim 9, wherein the output current charges a load, wherein the load has a load temperature, wherein the set current is generated using a thermistor, and wherein that output current varies inversely with the load temperature.

* * * * *